(12) United States Patent
Drews et al.

(10) Patent No.: US 7,722,987 B2
(45) Date of Patent: May 25, 2010

(54) GALVANIC CELL

(75) Inventors: Juergen Drews, Pirna (DE); Steffen Hickmann, Heidenau (DE); Roland Staub, Berggiesshuebel (DE)

(73) Assignee: Biotronik CRM Patent AG (CH)

( * ) Notice: Subject to any disclaimer, the term of this patent is extended or adjusted under 35 U.S.C. 154(b) by 928 days.

(21) Appl. No.: 11/352,790

(22) Filed: Feb. 13, 2006

(65) Prior Publication Data

US 2006/0194108 A1    Aug. 31, 2006

(30) Foreign Application Priority Data

Feb. 14, 2005    (DE) .................. 10 2005 007 179

(51) Int. Cl.
*H01M 2/06*    (2006.01)
(52) U.S. Cl. ................ 429/208; 429/177; 429/209; 429/211; 429/228
(58) Field of Classification Search ................ 429/228, 429/211, 209, 208, 177; *H01M 2/06*
See application file for complete search history.

(56) References Cited

U.S. PATENT DOCUMENTS

| | | |
|---|---|---|
| 2,702,829 A | 2/1955 | Chapel |
| 4,964,877 A | 10/1990 | Keister et al. |
| 5,256,502 A | 10/1993 | Kump |
| 5,587,258 A | 12/1996 | Fehrmann et al. |
| 5,604,051 A * | 2/1997 | Pulley et al. .................. 429/99 |
| 6,004,692 A | 12/1999 | Muffoletto et al. |
| 2001/0008725 A1 | 7/2001 | Howard |
| 2002/0119367 A1* | 8/2002 | Watanabe et al. ........... 429/129 |

FOREIGN PATENT DOCUMENTS

| | | |
|---|---|---|
| DE | 4438784 A1 | 4/1995 |
| DE | 69432392 T2 | 4/2003 |
| EP | 0237146 B1 | 10/1991 |
| EP | 0655793 | 4/2003 |
| JP | 11025951 A | 1/1999 |
| WO | 96/12319 A1 | 4/1996 |

* cited by examiner

*Primary Examiner*—Dah-Wei D Yuan
*Assistant Examiner*—Patricia Davis
(74) *Attorney, Agent, or Firm*—Hahn Loeser & Parks, LLP; John J. Cunniff

(57) ABSTRACT

A battery having a housing assembled from multiple parts, of which one housing part is implemented like a vessel having an initially open front side and the other housing part is a closure part, which closes the vessel-like housing part on its initially open front side, and having at least one first and at least one second electrode, each of which is formed by a planar material, of which the first electrode is electrically connected to an electrically conductive housing part of the battery, while the second electrode is electrically connected to an electrically conductive contact, which is electrically insulated from the remaining housing, the battery comprising a molded part which is provided with at least one first recess for receiving and positioning at least one section of the first electrode or the first electrodes at a time.

20 Claims, 5 Drawing Sheets

GALVANIC CELL

BACKGROUND OF THE INVENTION

The present invention relates to a galvanic cell, also referred to as a battery in the following, which is particularly suitable for use in electromedical implants such as pacemakers, defibrillators and the like.

Special implants of this type place high demands on a battery, since the power supply of the implant is typically only provided by the battery. If the battery is exhausted or also in case of a technical problem with the battery, the entire implant must typically be replaced. This typically requires surgery and a hospital stay. Therefore, high demands are placed both on the energy density of the galvanic cell and also on its reliability.

Typically, hermetically sealed galvanic cells of high energy and power density are used as batteries for implants such as pacemakers or defibrillators. Galvanic cells of this type are especially suitable for use in implantable medical devices. Corresponding batteries are, for example, described in U.S. Pat. No. 5,587,258 and DE 44 38 784. The manifold possibilities for implementing a corresponding battery result, for example, from the publication of Boone B. Owens (editor) "Batteries for Implantable Biomedical Devices" Plenum Press, New York and London, 1986 and from D. Linden, T. B. Redy "Handbook of Batteries" McGraw-Hill Professional Publishing, New York 2001.

Known batteries have a housing which is typically first open and is hermetically sealed after completion of the battery, of which, for example, one housing part may first be implemented as a vessel having an initially open front side, while the other housing part is a closure part which finally hermetically seals the vessel-like housing part on its initially open front side.

Two types of electrodes are positioned in such a housing, namely anodes and cathodes, which are each formed by planar material and are layered into a stack in one embodiment variation. The first type of electrode is frequently electrically connected to an electrically conductive housing part of the battery, while the second type of electrode is electrically connected to an electrically conductive contact which is electrically insulated from the remaining housing. This contact is frequently a component of a housing bushing, which may also be a filter bushing. An image of a corresponding battery known from the related art is founding FIG. 1.

The present invention is based on the aspect of providing a battery optimized in regard to energy density and reliability, which is also to be produced as favorably as possible.

BRIEF SUMMARY OF THE INVENTION

This aspect is achieved, according to the present invention, by a battery of the type described above, which has a molded part neighboring the closure part of the housing, which is provided with at least one recess for receiving and positioning at least one section of the first electrode or the first electrodes.

This molded part may preferably be made of an electrically insulating material, such as plastic, and preferably has a separate receptacle for each of the first electrodes. It is thus possible to place the first electrodes in the molded part and position them in relation to one another. In a preferred embodiment variation, the molded part additionally has receptacles for the second electrodes, so that both types of electrodes may be positioned similarly in relation to one another using the molded part.

The recess used for receiving a section of the particular electrodes may have the form of a flat slot, for example, in which a correspondingly shaped contact tab of a particular electrode is then to be inserted. Correspondingly, the first electrodes and, in a preferred embodiment variation, also the second electrodes each have at least one contact tab, i.e., a section of the particular electrode which extends beyond a primary contour of the particular electrodes. This primary contour is defined, for example, by three edges adjoining one another at right angles. The fourth edge, which closes the primary contour, may be tailored to the shape of the vessel-like housing part in this case.

If, according to a preferred embodiment variation, both the first type of electrode and also the second type of electrode each have contact tabs, it is advantageous if the contact tabs of the first type of electrode point in a different direction from the contact tabs of the second type of electrode. Correspondingly, a molded part provided with appropriate recesses for receiving the particular contact tabs has two legs which point in different directions, which are preferably positioned perpendicularly to one another. One leg has the recesses for receiving the contact tab of the first type of electrodes, while the second leg has the recesses for receiving the contact tab of the second type of electrodes.

The contact tabs of the second type of electrodes are preferably implemented to contact an electrical contact in, for example, the form of an electrically conductive pin of a bushing. A bushing of this type typically projects by a certain amount into the interior of a corresponding battery. From the aspect of optimizing the energy density of the battery, it is advantageous if the area of the individual electrodes is as large as possible. In order to nonetheless provide space in the interior of the battery housing for an inwardly projecting bushing, it is advantageous if the electrodes have openings pointing inward in relation to their primary contour, which provide space for the bushing projecting into the interior of the battery housing. The particular opening is preferably positioned in a corner of the primary contour, so that the opening is open for the bushing toward two edges of the primary contour.

The contact tab of the second type of electrodes used for contacting the electrically conductive pin of the bushing preferably projects into the opening used for receiving the bushing.

For this purpose, the molded part and the electrodes are preferably designed in such a way that, when the battery is mounted, the contact tabs of the second type of electrodes extend through the recesses of the molded part for the contact tabs of the second type of electrodes to the electrically conductive contact pin of the bushing. For this purpose, the corresponding leg of the molded part is positioned in such a way that it points into the interior of the housing and delimits the space formed by the stack electrodes and the recesses to receive the bushing on one side.

In connection with the latter constellation, it is especially favorable if the molded part has a receptacle for the bushing in which the bushing is to be inserted in such a way that the bushing is positioned correctly for mounting. This receptacle preferably adjoins the second leg of the molded part projecting into the interior of the housing, which has the recesses for receiving the contact tabs of the second type of electrodes.

The first leg of the molded part, which the second leg of the molded part cited above preferably runs perpendicularly to, preferably extends over the part of the front side of the vessel-like housing part which remains free next to the bushing when the battery is mounted. The first leg of the molded part preferably runs parallel and in close proximity to the closure part, using which the vessel-like housing part is finally closed, in this case, so that a hermetically sealed battery housing results.

On the basis of the features described above, a novel galvanic cell results, which has a high energy density, since the space filled by the electrodes of the galvanic cell is as large as possible and the space filled by the remaining elements of the battery, such as the insulating molded part or the bushing, is as small as possible.

Simultaneously, the mounting of the battery is made easier and the functional reliability of the battery is increased, in that the electrodes may be positioned and fixed by the molded part. The molded part simultaneously allows secure contacting of the electrodes via their contact tabs, which are each individually held securely in a separate slot by the molded part.

The advantages cited become possible by providing the molded part, which has corresponding recesses at least for a first type of electrode, which are used for positioning a section of the electrodes. The present invention is to be explained in greater detail on the basis of an exemplary embodiment with reference to the drawing.

DETAILED DESCRIPTION OF THE INVENTION

Figure 1:
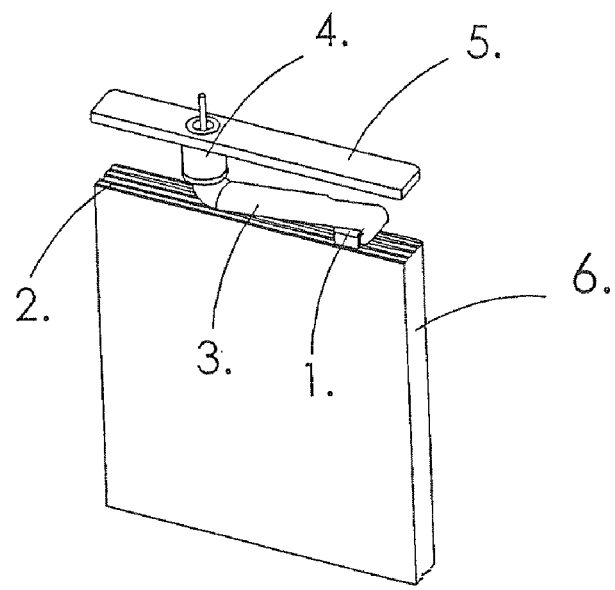
FIG. 1: shows a battery (galvanic cell) of a typical type for use in electrode medical implants such as pacemakers.

FIG. 1 shows a battery according to the related art. The battery has a housing having a vessel-like housing part 6 and a closure part 5, through which a bushing 4 is guided. When the battery is completely assembled, the vessel-like housing part 6, the closure part 5, and the bushing 4 are connected to one another so tightly that the battery is hermetically sealed. Electrodes 2 are positioned in the interior of the housing, which are provided with contact tabs 1. The contact tabs 1 of the electrodes 2 are combined and electrically connected to a contact in the form of a bent metal pin 3 of the bushing 4, which is implemented as a glass-metal bushing, preferably through welding. When the closure part 5 is closed, the bent pin 3 is pressed down on the electrodes 2 combined into a packet and fixed in this position by welding the closure part 5 to the housing part 6 like a hollow vessel.

Figure 2:
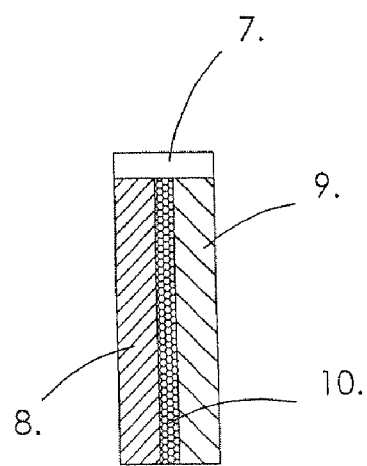
FIG. 2: shows a coarse schematic illustration of the basic construction of a suitable galvanic cell.

FIG. 2 shows the schematic construction of a battery according to the present invention.

The electrodes 8, 9 of the battery are preferably implemented as rectangular. The width of the electrodes is selected in such a way that the housing is filled up as completely as possible (FIG. 2). The height of the electrodes is selected in such a way that a free space 7 results between the electrodes and the closure part of the battery housing, into which a molded part according to the present invention is inserted to fit precisely. The electrodes of the battery, specifically anodes 8 and cathodes 9, are each positioned diametrically opposite, separated by at least one ion-conducting, electrically-insulating separator 10.

Figure 3:
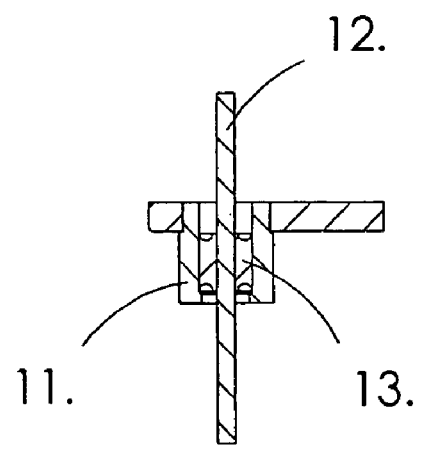
FIG. 3: shows an illustration of a typical glass-metal bushing as a housing bushing for a galvanic cell of the type described here.

A pole of the battery is guided with the aid of the glass-metal bushing through the closure part of the housing, see FIG. 3. The glass-metal bushing has a metallic bush 11, in which a metallic pin 12 is embedded using glass 13. For this purpose, the glass 13 of the glass-metal bushing ensures the insulation of the pin 12 to the bush 11 and therefore to the housing and simultaneously ensures the hermetic seal of the battery. The cathode 9 of the battery is preferably contacted at the pin 12 of the glass-metal bushing. The anode 8 is preferably contacted at the metallic housing of the battery.

Figure 4:
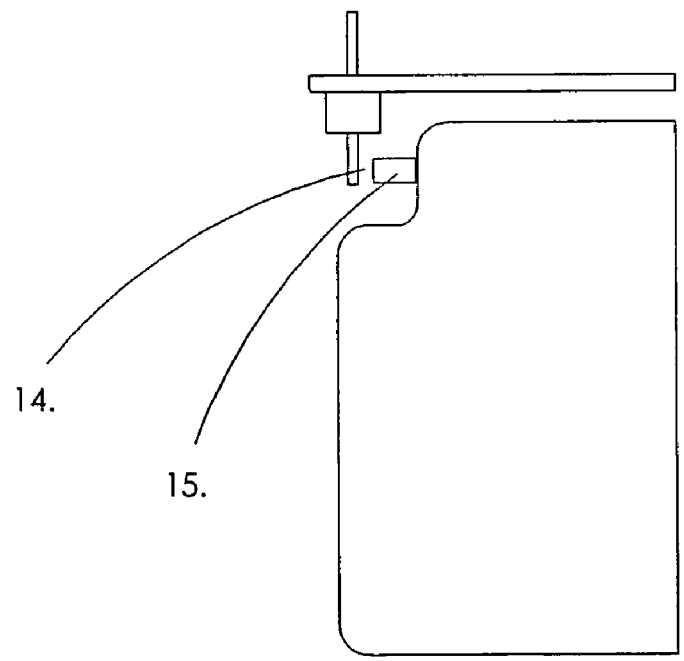
FIG. 4: shows a schematic illustration which reflects the contacting of a housing bushing as in FIG. 3 by contact tabs of a second type of electrode.
Figure 5:
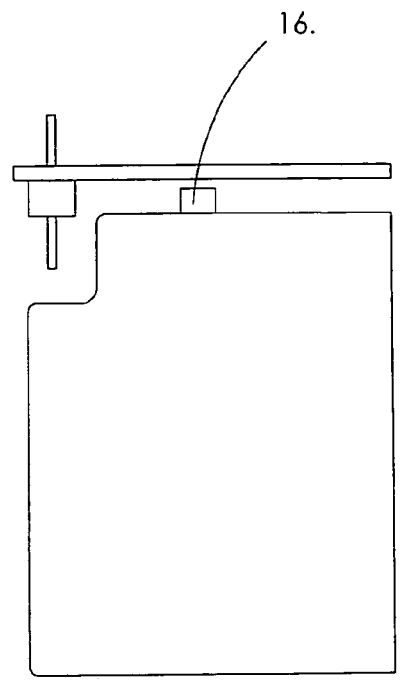
FIG. 5: shows a schematic illustration of a first type of electrode in combination with a molded part carrying a bushing.

As may be seen from FIGS. 4 and 5, the electrodes have a recess 14, which is located below the position in which the glass-metal bushing is inserted into the cover of the battery. The arresters of the electrodes are provided with metallic contact tabs 15, 16, via which the arresters are electrically connected to the housing and/or the pin of the glass-metal bushing. The contact tab 15, which is connected to the pin of the glass-metal bushing (preferably the contact tab of the cathode), is positioned in such a way that it points in the direction of the glass-metal bushing. The contact tab 16, which is connected to the battery housing (preferably the contact tab of the anode) is positioned in such a way that it points in the direction of the housing cover.

Figure 6:
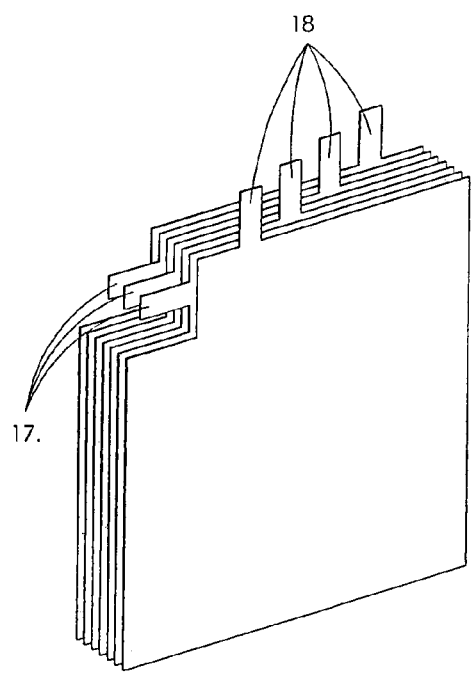
FIG. 6: shows a stack of first and second electrodes having corresponding contact tabs.
Figure 7:
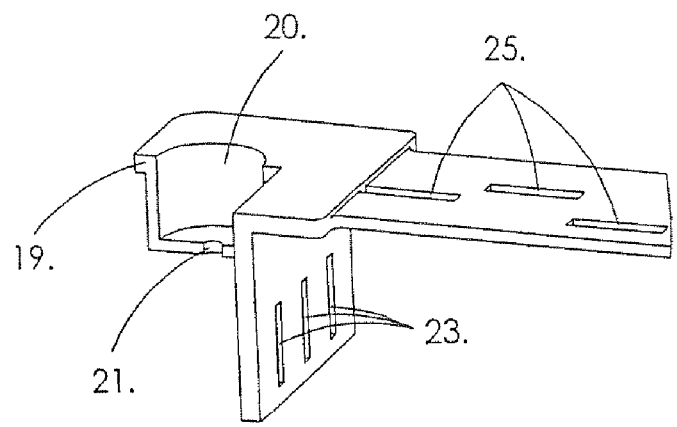
FIG. 7: shows a detail of an especially suitable molded part in a perspective illustration.
Figure 8:
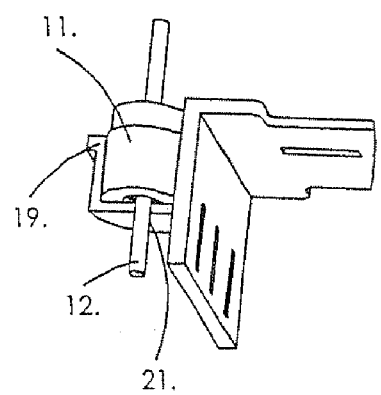
FIG. 8: shows a detail of the molded part illustrated in FIG. 7 having inserted bushing.
Figure 9:
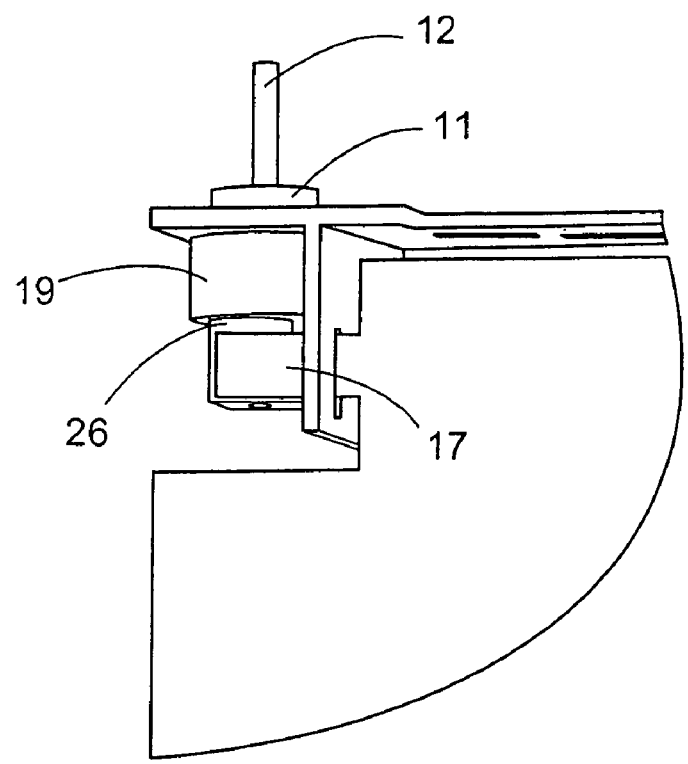
FIG. 9: shows a detail of the molded part from FIG. 7 having inserted bushing and an inserted electrode of the second type (cathode) having contact tabs for contacting an electrically conductive pin of the bushing.
Figure 10:
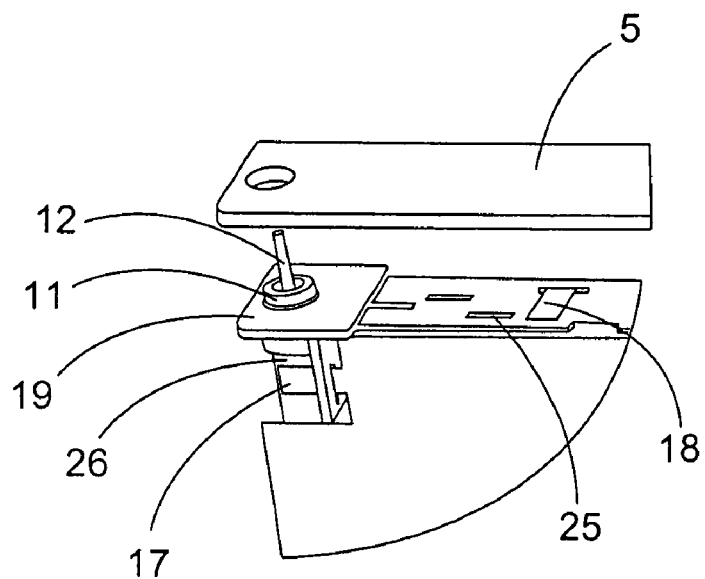
FIG. 10: shows the detail illustrated in FIG. 9 having an additional inserted electrode of the first type (anode) and a housing closure.

If the battery comprises multiple anodes and/or cathodes, as shown in FIG. 6, they are assembled by stacking, winding, or folding in such a way that an arrangement arises in which each cathode is diametrically opposite an anode. The electrodes are each separated from one another for this purpose by an ion-conducting, electrically-insulating separator 10. In this case, the contact tabs 17, which have been connected to the pin of the glass-metal bushing (preferably the contact tabs of the cathode), are positioned parallel in a plane and point in the direction of the glass-metal bushing. The contact tabs 18, which have been connected to the battery housing (preferably the contact tabs of the anode), are positioned offset and exit below the closure part. In the following, the form and function of the molded part will be discussed in greater detail.

This molded part is preferably manufactured from an electrically-insulating polymer material which is inert in relation to the electrolytes of the battery. Polyolefins such as polyethylene or polypropylene or polyhalogenated polymers or copolymers such as TEFLON®, HALAR®, KYNAR®, or SOLEF® are especially suitable. Polymers which may be thermoplastically molded are especially preferred. The molded part may also be made of a composite material (such as polymers filled with inorganic materials), in order to improve the mechanical properties of the material.

In the following, advantages of the battery according to the present invention, as shown in FIGS. 7 through 10, are to be described once again in relation to a battery known from the related art, as shown in FIG. 1:

The contact tabs 18, which are connected to the closure part 5 of the housing, are positioned offset. The required free space above the electrodes is thus limited to a size which results from the material thickness of the complex part above the electrodes and the material thickness of only one contact tab 18. The energy density of the battery is increased in this way.

The molded part fulfills multiple functions in this case:

The part of the molded part, in the concrete exemplary embodiment the receptacle 19, 20, 21, which encloses the bush 11 of the glass-metal bushing protects the bushing from mechanical damage.

The receptacle 19 which encloses the bush 11 of the glass-metal bushing protects the bushing from short circuits. Additional insulation may be dispensed with in this area.

The contact tabs 17, 18 are guided in a controlled way through the slotted receptacles 23, 25 of the molded part and the danger of short circuits is thus minimized.

The construction and assembly of the battery (galvanic cell) is performed very effectively, since the number of individual parts required for assembly is reduced by using a complex molded part.

Through the molded part, it is possible to perform the contacting at the pin 12 of the glass-metal bushing without having to deform it. The assembly is simplified in this way, and the risk of damage to the glass-metal bushing by deforming the pin 12 is simultaneously minimized.

The molded part insulates the electrodes in relation to the cover, so that additional insulation may be dispensed with in this area.

What is claimed:

1. A battery comprising:
   a housing assembled from multiple parts, of which a first housing part is implemented like a vessel having an initially open front side and a second housing part is a closure part, which closes the vessel-like housing part on its initially open front side,
   and having at least one first and at least one second electrode, each of which are formed by a planar material, of which the first electrode is electrically connected to an electrically conductive housing part of the battery, while the second electrode is connected to an electrically conductive contact which is electrically insulated from the remaining housing,
   wherein the battery comprises a molded part which is provided with at least one first recess for receiving and positioning at least one section of the first electrode or the first electrodes, and
   wherein the at least one first and at least one second electrodes each have a primary contour, and
   further wherein the at least one first and at least one second electrodes each have a recess which is open toward at least one of the edges of the primary contour in the top view of the particular electrode, and the at least one second electrode has a second electrode contact tab for contacting the electrically conductive contact, and the second electrode contact tab projects into the second electrode recess but does not project beyond the second electrode recess, and
   further wherein the electrically conductive contact projects into the recess of the second electrode for contacting the second electrode contact tab.

2. The battery according to claim 1, wherein the molded part is positioned between the at least one first and second electrodes and the closure part of the battery.

3. The battery according to claim 2, wherein the at least one first electrode has at least a first electrode contact tab projecting out beyond the primary contour of the at least one first electrode.

4. The battery according to claim 3, wherein the primary contour has at least three adjoining edges which are positioned at least approximately perpendicularly to one another and the particular first contact tab adjoins the middle of the three edges.

5. The battery according to claim 4, wherein the battery has multiple first electrodes and the contact tabs of the individual electrodes are positioned offset to one another in the longitudinal direction of the middle edge.

6. The battery according to claim 5, wherein the particular first recess of the molded part is designed to receive precisely one first contact tab.

7. The battery according to claim 6, wherein the molded part has at least one second recess for receiving and positioning at least one section of the second electrode or the second electrodes.

8. The battery according to claim 3, wherein the molded part has at least one second recess for receiving the particular second contact tab.

9. The battery according to claim 6, wherein the molded part has a first and/or second recess for receiving precisely one contact tab for each first and second contact tab.

10. The battery according to claim 9, wherein the second contact tabs point in the direction running perpendicularly to the first contact tabs and the molded part has a first leg running parallel to the open front side, in which the first recesses are located, and a second leg, in which the second recesses are located, oriented perpendicularly to the first leg.

11. The battery according to claim 10, wherein the electrically conductive contact is part of a bushing, which, in addition to the contact, comprises an insulating body enclosing the contact.

12. The battery according to claim 11, wherein the molded part has a receptacle for the bushing.

13. The battery according to claim 12, wherein the receptacle is designed in the shape of a half cylinder in such way that the bushing is to be inserted laterally into the receptacle.

14. The battery according to claim 13, wherein the receptacle is designed in such a way that the bushing is electrically insulated at least on its front side in relation to the second type of electrodes.

15. The battery according to claim 12, wherein the first leg adjoins perpendicularly to a first flat side of the second leg and the receptacle adjoins a second flat side of the second leg facing toward this first flat side of the second leg.

16. The battery according to claim 15, wherein multiple electrodes, alternately following first and second electrodes each having the identical primary contour are provided, which are positioned next to one another with flat sides facing toward one another in such way that the primary contours of the electrodes are congruent in a corresponding top view.

17. The battery according to claim 16, wherein a fourth edge of the primary contour closes the primary contour and has a shape which is tailored to the shape of the vessel-like housing part in such a way that the fourth edge extends up to close to the floor of the vessel-like housing part, which is diametrically opposite the initially open front side of the vessel-like housing part.

18. The battery according to claim 11, wherein the insulation body is made of glass or ceramic.

19. The battery according to claim 10, wherein the molded part is positioned in such way that its first leg runs in direct proximity and parallel to the closure part and the second leg points into the interior of the vessel-like housing part.

20. The battery according to claim 19, wherein the first electrode or the first electrodes are implemented as anodes and the second electrode or the second electrodes are implemented as cathodes.

* * * * *